United States Patent [19]

Mirring

[11] 4,257,655

[45] Mar. 24, 1981

[54] ROLLING BEARING HAVING SEPARATE RESTRAINING RING FOR HOLDING ROLLING ELEMENTS

[75] Inventor: Knut Mirring, Gochsheim, Fed. Rep. of Germany

[73] Assignee: SKF Kugellagerfabriken GmbH, Schweinfurt, Fed. Rep. of Germany

[21] Appl. No.: 954,769

[22] Filed: Oct. 26, 1978

[30] Foreign Application Priority Data

Oct. 27, 1977 [DE] Fed. Rep. of Germany ... 7733084[U]

[51] Int. Cl.³ .............................................. F16C 33/58
[52] U.S. Cl. .................................... 308/216; 308/198; 308/DIG. 11; 308/236
[58] Field of Search ............... 308/216, 236, DIG. 11, 308/198, 207 R, 189 R; 29/148.4 C; 277/50

[56] References Cited

U.S. PATENT DOCUMENTS

| | | | |
|---|---|---|---|
| 2,468,171 | 4/1949 | Carlson | 29/148.4 C |
| 2,552,166 | 5/1951 | Gardiner | 308/DIG. 11 |
| 3,396,975 | 8/1968 | Otto | 277/50 |
| 3,707,315 | 12/1972 | Goodfellow | 308/216 |
| 3,733,109 | 5/1973 | Hallerback | 308/216 |

FOREIGN PATENT DOCUMENTS 1575610  3/1972  Fed. Rep. of Germany .

Primary Examiner—Lenard A. Footland
Attorney, Agent, or Firm—Daniel M. Rosen

[57] ABSTRACT

In a rolling bearing wherein rolling elements radially engage a bearing ring, a separate flange ring is positioned to inhibit axial movement of the rolling elements. The flange ring is held axially and radially by a retaining ring having a first arm that extends into an annular groove of the bearing ring and a second arm that extends axially outwardly of the bearing from the first arm, to fill the intermediate space between the bearing ring and the flange ring. The end of the last mentioned arm is bent radially inwardly to axially engage the end face of the flange ring.

7 Claims, 5 Drawing Figures

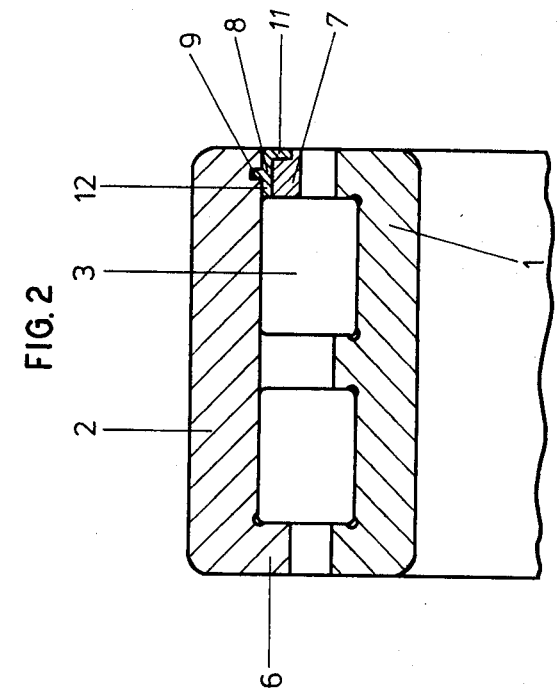
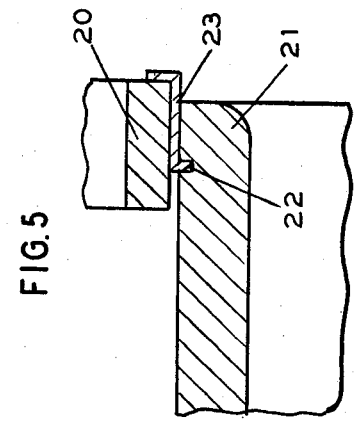
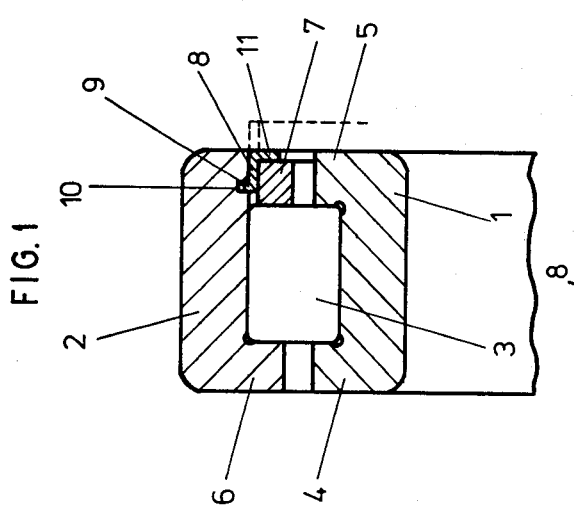
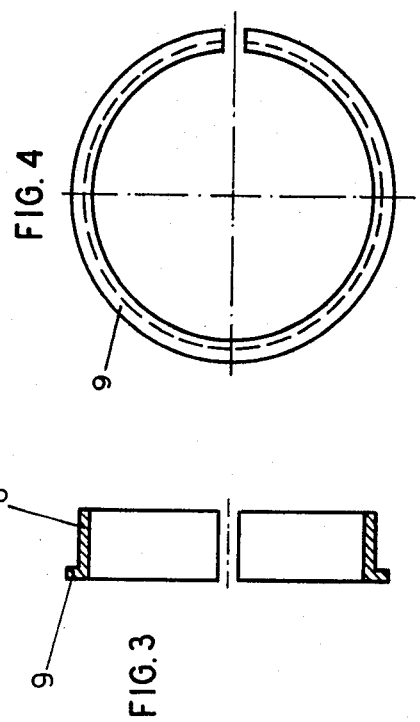

ROLLING BEARING HAVING SEPARATE RESTRAINING RING FOR HOLDING ROLLING ELEMENTS

BACKGROUND OF THE INVENTION

This invention relates to rolling bearings, and it particularly directed to rolling bearings having separately fabricated flange or shoulder rings on one of the bearing rings.

For various reasons, it is desirable to provide restraining flanges or shoulder rings as elements separate from the bearing rings of a bearing, rather than as a part of the bearing ring. In addition to simpler and less expensive machining of the races in some cases, the races of cylindrical or needle bearings, for example, can be continuously and readily ground. These bearings also provide the advantage that the assembly thereof is simplified. In fact, in bearings having completely unfixed rollers, it is extremely advantageous to prepare at least one of the side restraining flanges separately from the actual bearing ring and to affix in on the respective bearing ring after the assembly of the bearing, in order to enable simpler construction of the bearing, to enable the use of more rolling elements in the bearing, and to increase the load carrying capacity of the bearing.

Needle bearings are already known in which a relatively small flange piece is affixed to the bearing ring by means of a retaining ring of sheet metal or strap iron. This retaining ring is formed with an L-shaped cross section, whereby the arm of the retaining ring which engages a side surface of the flange or shoulder ring, also engages the annular groove of the bearing ring. The other arm runs essentially axially inwardly in contact with the surface of the flange ring, gripping under the flange ring, and simultaneously serving to radially hold the tapered ends of the needles with its axially extending projection. This arrangement has the disadvantage that the flange ring can easily be installed in an inclined or tilted position as a result of its relatively small supporting surface. This is an especial disadvantage if this shoulder or flange ring is employed to guide the rolling bodies to extend parallel to the axis of the bearing, that is, with their facing side surfaces engaging the oppositely lying surfaces of the flange ring for support.

A further arrangement for mounting the separately prepared shoulder ring on the corresponding rolling bearing ring is known, in which a locking element of soft material holds the shoulder ring in the axial direction and engages a groove in the bearing ring. The locking element extends in the space between the flange ring and the bearing ring and is directed outwardly in the groove, by a determined shaping of the outer contour of the flange ring. This known arrangement is relatively costly, and it does not always insure a satisfactory position and a satisfactory support for the flange ring with reference to the rolling body ring.

The present invention is thereby directed to the production of a rolling body of the above type, in which the separately formed flange or shoulder ring is held in the axial direction in a simpler manner, that is, without great expense as well as in a reliable manner.

SUMMARY OF THE INVENTION

Briefly stated, in accordance with the present invention, the above objective is achieved by providing a retaining ring having an L-shaped cross section. One arm of the retaining ring extends into an annular groove of the bearing ring, and the other arm of the retaining ring extends generally in the axial direction between the race of the bearing ring and the flange or shoulder ring, filling the annular space therebetween. The free end of this latter arm, after the insertion of the flange or shoulder ring, is bent around in a direction opposite the direction of the arm which engages the annular groove in a bearing ring, so that the free end thereby engages the face or surface of the flange or shoulder ring away from the rolling elements.

In this arrangement for mounting the flange ring in place, the second arm runs axially, i.e., along the race of the bearing ring, a determined distance, so that the space between the flange or shoulder ring and the bearing is filled. In this manner the flange ring is accurately positioned in the radial direction, so that tilting of the flange ring cannot occur. The free end of the retaining ring, i.e., the overhanging end, is bent around so that it firmly holds the flange ring in the axial direction.

According to a further feature of the invention, the retaining ring may have a sleeve shaped arm extending from both sides of the arm which engages the annular groove of the bearing ring. As a result, a larger support surface for the flange or shoulder ring is provided.

BRIEF FIGURE DESCRIPTION

In order that the invention will be more clearly understood, it will now be disclosed in greater detail with reference to the accompanying drawings, wherein:

FIG. 1 is a cross sectional view of a portion of a single row cylindrical roller bearing with a separate flange ring on the outer ring, in accordance with one embodiment of the invention;

FIG. 2 is a cross sectional view of a portion of a two row cylindrical roller bearing, in accordance with the invention;

FIG. 3 is a cross sectional view of a retaining ring, in the non-installed condition, in accordance with the invention;

FIG. 4 is a side view of the retaining ring of FIG. 3; and

FIG. 5 is a cross sectional view of a portion of another embodiment of the invention, wherein the separate flange ring is employed in combination with an inner bearing ring.

DETAILED DESCRIPTION OF THE DRAWINGS

Referring now to FIGS. 1-4, the bearing according to FIG. 1 is comprised of an inner ring 1, and outer ring 2, and a plurality of cylindrical rollers 3 (only one of which is illustrated) distributed about the circumference of the annular space between the bearing rings. In order to axially hold the cylindrical roller 3, integral radially outwardly extending end flanges 4 and 5 are provided on the inner ring 1, and an integral radially inwardly extending flange 6 is provided on one end of the outer ring 2. A separate flange ring 7, i.e., separate from the outer ring 2, is provided within the bore of the other end of the outer ring 2. It is of course apparent that the flanges and flange ring are of dimensions to enable them to axially fix the positions of the rolling elements 3. The separate flange ring 7 is held in the outer ring 2 by a retaining ring 8 having an L-shaped cross section. The retaining ring 8 has a radially extending arm 9 which engages an annular groove 10 in the bore or race of the outer ring, the groove 10 being spaced from the corresponding end of the outer ring a distance such that it radially overlies the flange 7. The other arm 15 of the annular cross section of the retaining ring 8 overlies the circumferential surface of the flange ring 7, and fills the corresponding annular space between the flange ring and the bore surface of the outer ring 2. The free end of the arm 15 of the retaining ring extends axially beyond the flange ring, as shown in dashed lines in FIG. 1. After the assembly of the flange ring 7, this extending end is bent radially inwardly to provide a flange 11 which engages the axially outer face or surface of the flange ring 7, thereby to axially position the flange ring 7. The retaining ring 8, as is evident in FIGS. 3 and 4, is provided with an axially extending slit at one position along its circumference, so that it can be radially deformed to simplify its assembly in the annular groove 10 of the outer ring. The assembly of the bearing is thereby effected in the following manner:

The rolling bodies 3 are first inserted against the outer circumferential surface of the inner ring 1, which defines a race, between the flanges 4 and 5. The outer ring 2 is then shoved over the rolling bodies, until the end flange 6 thereof is aligned with the corresponding end flange 4 of the inner ring. Next, the undeformed retaining ring, shown in FIG. 1 in dash lines, is radially deformed so that it can be inserted in the bore of the outer ring 2. Then the retaining ring is radially outwardly sprung or deformed, so that the arm 9 thereof is received in the annular groove 10 of the outer ring. The flange ring 7 is then inserted in the "sleeve" formed by the axially extending arm 15 of the retaining ring 8, to a position where it can form a support for the end faces of the rolling elements 3. Finally, the free ends 11 of the retaining ring 8 is bent radially inwardly, in order to prevent the flange ring 7 from falling out of the bearing.

FIG. 2 of the drawing shows a two row cylindrical roller bearing wherein the outer ring is formed in one piece with the side flange thereof, as in the arrangement of FIG. 1. A separate flange ring 7 is provided at the other end of the outer ring, in the manner discussed above with reference to FIG. 1. The flange ring 7 is held in the axial direction by means of the retaining ring 8, which is mounted to engage the annular groove 10 in the outer ring. The retaining ring 8 of the arrangement of FIG. 2 differs from that of FIG. 1, in that in the arrangement of FIG. 2 the retaining ring has a T-shaped cross section. In other words, the retaining ring 8 has an arm 15 extending axially outwardly of the bearing from the arm 9, as well as an arm 12 extending axially inwardly of the bearing from the arm 9. The retaining ring thereby extends axially, on both sides of the arm 9, to completely fill the space between the bearing ring 2 and the flange ring 7. In this manner a greater support surface for the flange rings 7 is provided, so that tilting of the flange ring 7 in the bearing assembly is completely avoided.

It will of course be apparent that the modifications of the invention illustrated in FIGS. 1 and 2 are not limited to the specific type of bearing structures illustrated therein. Thus, either form of flange ring retaining element may be employed in a rolling bearing having any desired number of rows of rolling elements. In general, it may be stated that the L-shaped retaining ring is bent or deformed, after assembly, such that the end of the axially extending arm is bent radially in a direction opposite to that of the other end of the retaining ring. Reference to the L-shaped retaining ring therefore is based upon the configuration of this ring before assembly thereof, as illustrated in FIGS. 3 and 4. The retaining ring, for holding the flange ring in position, is preferably metallic.

The above invention is not limited to cylindrical roller bearings with separate flange rings in the outer bearing ring. In a similar manner, a separate flange ring can be provided on the inner bearing ring. Thus, as illustrated in FIG. 5, a separate end flange ring 20 is provided for axially restraining rolling elements (not shown) in contact with in inner race ring 21. The inner race ring has an annular groove 22 therein aligned with the flange ring 21, and a retaining ring 23 has a radially inwardly extending arm engaging the groove 22. The retaining ring extends from the groove 22 in an axially outwardly direction, in the space between the bearing ring and the flange ring, to radially support the flange ring from tilting or the like. As in the above examples, the other end of the flange ring 23 is bent radially (in a radial outward direction) to axially engage the axial outer end face of the flange ring. In addition, the invention can also by employed on rolling bearings of other type than cylindrical rolling bearings, in which one of the flange or shoulder rings is provided as an element that is separate from the bearing ring proper. It is therefore intended in the following claims to cover each such variation and modification as follows within the true spirit and scope of the invention.

What is claimed is:

1. In a rolling bearing having an at least partially axially extending bearing race ring for engaging rolling elements, and a separate annular flange ring mounted to restrain axial movement of said rolling elements; the improvement wherein the flange ring is completely separated and radially spaced from said race ring, said race having an annular groove radially aligned with a portion of said flange ring, a retaining ring, said retaining ring extending radially into said annular groove and having a portion extending thence axially outwardly of said bearing to entirely fill the space in a radial direction between said bearing race ring and flange ring, in the region axially outwardly of said groove, said portion of said retaining ring having an end axially engaging an axial outer end surface of said flange ring, said end axially holding said flange ring in said bearing.

2. The rolling bearing of claim 1 wherein said retaining ring has an axially extending split.

3. The rolling bearing of claim 1 wherein said bearing ring comprises an inner race ring.

4. The rolling bearing of claim 1 wherein said bearing ring is an outer bearing ring.

5. The rolling bearing of claim 1 wherein said retaining ring has a further arm extending axially inwardly of said annular groove to substantially fill the space between said bearing ring and the other end of said flange ring.

6. In a rolling bearing having an at least partially axially extending bearing race ring for engaging rolling elements, and a separate annular flange ring mounted to restrain axial movement of said rolling elements; the improvement wherein the flange ring is completely separated and radially spaced from said race ring; said race ring having an annular groove radially aligned with a portion of said flange ring and axially spaced from the ends of said flange ring and race ring, and a retaining ring, said retaining ring having a first radially extending end engaging said annular groove, a central axially extending portion radially filling the space between said race ring and the portion of said flange ring axially outward of said groove, and a second end extending radially in the opposite direction from said first end and axially engaging a radially directed surface of said flange ring, said central axially extending portion joining said ends and radially supporting said flange ring.

7. A method for mounting a separate flange ring to a bearing ring for axially restraining rolling elements, comprising mounting a retaining ring to have a radially extending portion engaging a groove in a bearing race ring with an adjoining portion of said retaining ring radially engaging said bearing ring axially outwardly of said groove, thence positioning a flange ring to radially engage the surface of retaining ring opposite to that which contacts said bearing ring, and thence radially bending a remaining end of said retaining ring, in a direction opposite to that extending in said annular groove, to axially engage an axially outwardly directed surface of said flange ring.

* * * * *

UNITED STATES PATENT AND TRADEMARK OFFICE
CERTIFICATE OF CORRECTION

PATENT NO. : 4,257,655
DATED : March 24, 1981
INVENTOR(S) : Knut Mirring

It is certified that error appears in the above—identified patent and that said Letters Patent is hereby corrected as shown below:

Col. 1, line 41, delete "an especial" and insert -- a --.

Col. 3, line 34, delete "ends" and insert -- end --.

Col. 5, line 9, delete "restraining" and insert -- retaining --

Signed and Sealed this

Second Day of August 1983

[SEAL]

Attest:

GERALD J. MOSSINGHOFF

Attesting Officer     Commissioner of Patents and Trademarks